United States Patent [19]

Chang

[11] Patent Number: 5,971,490
[45] Date of Patent: *Oct. 26, 1999

[54] VEHICLE SEAT AND SEAT BELT ARRANGEMENT

[75] Inventor: Chung L. Chang, Diamond Bar, Calif.

[73] Assignee: I.A.P.M., Ltd., San Bernardino, Calif.

[*] Notice: This patent is subject to a terminal disclaimer.

[21] Appl. No.: 09/087,587

[22] Filed: May 29, 1998

Related U.S. Application Data

[63] Continuation of application No. 08/914,425, Aug. 19, 1997, abandoned, which is a continuation of application No. 08/548,207, Oct. 25, 1995, Pat. No. 5,722,731.

[51] Int. Cl.$^6$ .................................................. A47C 31/00
[52] U.S. Cl. ................... 297/473; 297/344.1; 297/452.2; 297/483
[58] Field of Search .................................. 297/344.1, 464, 297/473, 475, 483, 452.18, 452.1, 452.2, 474; 248/429

[56] References Cited

U.S. PATENT DOCUMENTS

| | | |
|---|---|---|
| 325,352 | 9/1885 | Mckay . |
| 778,821 | 12/1904 | Duryea . |
| 1,664,893 | 4/1928 | Meyering . |
| 2,153,998 | 4/1939 | Verderber et al. . |
| 2,336,013 | 12/1943 | Hamilton . |
| 2,725,097 | 11/1955 | Thoreson . |
| 2,949,043 | 8/1960 | Fichter et al. . |
| 3,081,114 | 3/1963 | Esty . |
| 3,156,004 | 11/1964 | Strien et al. . |
| 3,185,510 | 5/1965 | Huckins et al. . |
| 3,243,234 | 3/1966 | Fehlner . |
| 3,259,435 | 7/1966 | Jordan, Jr. . |

(List continued on next page.)

FOREIGN PATENT DOCUMENTS

| | | |
|---|---|---|
| 51819 | 2/1972 | Australia . |
| 758404 | 5/1967 | Canada . |
| 0006610 | 6/1979 | European Pat. Off. . |
| 1317273 | 5/1963 | France . |
| 2404216 | 8/1975 | Germany . |
| 2602022 | 7/1977 | Germany . |
| 2845545 | 4/1980 | Germany . |
| 3027629 | 2/1982 | Germany . |
| 3530495 | 3/1987 | Germany . |
| 5112205 | 5/1993 | Japan . |
| 747800 | 4/1956 | United Kingdom . |
| 941581 | 11/1963 | United Kingdom . |
| 1007119 | 10/1965 | United Kingdom . |
| 1342371 | 1/1974 | United Kingdom . |

OTHER PUBLICATIONS

Figures 1a & 1b—Prior Art Drawing; Hsin–Chun, Incorporated, Manufacturer, Jun. 1985, Taiwan.
Figure 2—Prior Art Drawing; Hsin–Chun, Incorporated, Manufacturer, Jun. 1985, Taiwan.

*Primary Examiner*—Milton Nelson, Jr.
*Attorney, Agent, or Firm*—Knobbe, Martens, Olson and Bear, LLP

[57] ABSTRACT

A seat and seat belt assembly wherein a platform is slidable relative a first track and a second track, a belt guide is mounted on the seat back, and seat belt retractor is mounted on the slidable platform beneath the belt guide. Preferably, substantially all the seat belt is mounted external the first and second interior envelopes, and the web of the seat belt extends flat along the first side of the seat back between the retractor and the belt guide and the axis of rotation of the retractor extends generally parallel to the first track. Advantageously, the belt guide is mounted on a second member which is moveable with respect to a first member which is fixed to the seat back. Advantageously, the seat back includes an external frame having an upper horizontal arm, a lower horizontal arm, a first vertical arm and a second vertical arm and an internal reinforcing member secured to the first vertical arm proximate the upper horizontal, secured to the lower horizontal and secured to the second vertical arm proximate the upper horizontal arm.

5 Claims, 7 Drawing Sheets

U.S. PATENT DOCUMENTS

| | | |
|---|---|---|
| 3,315,298 | 4/1967 | Strien et al. . |
| 3,398,987 | 8/1968 | Lynn et al. . |
| 3,432,881 | 3/1969 | Putsch et al. . |
| 3,479,088 | 11/1969 | Bonnaud . |
| 3,507,000 | 4/1970 | Strien et al. . |
| 3,602,547 | 8/1971 | Tabor . |
| 3,604,752 | 9/1971 | Macknick . |
| 3,608,128 | 9/1971 | Faust . |
| 3,638,243 | 2/1972 | Campbell, Jr. et al. . |
| 3,731,342 | 5/1973 | Cousin . |
| 3,788,698 | 1/1974 | Perkins . |
| 3,833,965 | 9/1974 | Hess . |
| 3,840,268 | 10/1974 | Johndrow . |
| 3,902,757 | 9/1975 | Yoshimura . |
| 3,912,035 | 10/1975 | Ulert . |
| 3,931,996 | 1/1976 | Yoshimura . |
| 3,966,253 | 6/1976 | Berghof et al. . |
| 3,973,288 | 8/1976 | Pickles . |
| 3,999,247 | 12/1976 | Cremer . |
| 4,085,969 | 4/1978 | Nakane . |
| 4,103,964 | 8/1978 | Klingelhofer et al. . |
| 4,147,386 | 4/1979 | Stolper . |
| 4,178,037 | 12/1979 | Pickles . |
| 4,223,947 | 9/1980 | Cremer . |
| 4,314,729 | 2/1982 | Klueting . |
| 4,457,557 | 7/1984 | Une . |
| 4,482,188 | 11/1984 | Tilly et al. . |
| 4,519,650 | 5/1985 | Terada et al. . |
| 4,588,228 | 5/1986 | Nemoto . |
| 4,669,782 | 6/1987 | Nishiyama et al. . |
| 4,673,217 | 6/1987 | Nishiyama et al. . |
| 4,722,573 | 2/1988 | Komohara . |
| 4,729,602 | 3/1988 | Tokugawa . |
| 4,749,231 | 6/1988 | Cremer et al. . |
| 4,783,122 | 11/1988 | Komohara . |
| 4,790,597 | 12/1988 | Bauer et al. . |
| 4,824,175 | 4/1989 | Tokugawa . |
| 4,872,726 | 10/1989 | White et al. . |
| 4,875,735 | 10/1989 | Moyer et al. . |
| 4,878,692 | 11/1989 | Ando et al. . |
| 4,881,781 | 11/1989 | Borlinghaus et al. . |
| 4,940,285 | 7/1990 | Suzuki et al. . |
| 4,969,687 | 11/1990 | Higuchi et al. . |
| 5,102,197 | 4/1992 | Itsuki . |
| 5,123,706 | 6/1992 | Granzow et al. . |
| 5,131,721 | 7/1992 | Okamoto . |
| 5,253,924 | 10/1993 | Glance ................................ 297/483 X |
| 5,280,959 | 1/1994 | Nanbu . |
| 5,310,247 | 5/1994 | Fujimori et al. . |
| 5,318,341 | 6/1994 | Griswold et al. . |
| 5,318,350 | 6/1994 | Okamoto . |
| 5,322,348 | 6/1994 | Johnson et al. . |
| 5,358,310 | 10/1994 | Nemoto . |
| 5,362,132 | 11/1994 | Griswold et al. . |
| 5,367,917 | 11/1994 | Hishon et al. . |
| 5,390,982 | 2/1995 | Johnson et al. . |
| 5,411,319 | 5/1995 | Kuiri . |

Fig. 8

VEHICLE SEAT AND SEAT BELT ARRANGEMENT

This application is a continuation of application Ser. No. 08/914,425, filed Aug. 19.1997, now abandoned, which was a continuation of application Ser. No. 08/548,207, filed Oct. 25, 1995, now U.S. Pat. No. 5,722,731.

FIELD OF THE INVENTION

This invention relates to vehicle seats and, in particular, to a vehicle seat and seat belt arrangement.

BACKGROUND AND SUMMARY OF THE INVENTION

Due to the loads exerted on seat belts during impact, vehicle seat belts are typically mounted directly to the vehicle structure. In this regard, many systems have a belt retractor mounted to the vehicle floor pang with the belt webbing extending upwardly along the B-pillar of the vehicle to a D-ring mounted to the pillar. The webbing then extends downward to a belt and is connected to the vehicle floor adjacent to the retractor. A clasp is slidably movable between the end of the seat belt anchored to the vehicle floor and the D-ring on the B-pillar. A buckle is attached to the vehicle floor on the opposite side of the seat. When the clasp is pulled across the user and inserted into the buckle, the webbing forms a lap belt and a shoulder belt to retain the occupant in the seat assembly.

This seat belt arrangement has a number of drawbacks. For example, in four-door cars the mounting of the seat belt to the floor of the vehicle prevents the seat belt from moving with the rider when the vehicle seat is adjusted, with the passenger positioned in the seat. This results in the undesirable loosening or tightening of the seat belt about the rider.

In two-door cars the seat belt is typically secured from the wall of the vehicle to the rear of the door. When the vehicle seat is in a forward position, this can result in the seat belt being positioned an uncomfortable distance to the rear of the vehicle seat. Likewise, when the seat is in an extreme rearward position, the seat belt may be positioned too loosely on the occupant.

Numerous efforts have been made to address these problems by mounting the seat belt directly on the vehicle seat. In general, such arrangements have fallen into two general classes: a first, where the seat belt retractor is mounted within the frame of the bottom of the seat, with the retractor axis extending from side to side, and the seat belt webbing extending upwardly through the seat back to an upper roller or guide and then downward at an angle to the inner side of the seat, and a second, where the seat belt retractor is mounted either at the top or within the top of the vehicle seat back. Unfortunately, each of these prior art arrangements has a number of drawbacks.

Griswold, et al., U.S. Pat. No. 5,318,341 discloses a vehicle seat assembly with a seat belt retractor mounted at the bottom of the vehicle seat, with the axis extending from side to side within the frame of the seat. The seat back frame includes a hollow main beam along the outboard side of the seat, a bent tube forming an upper cross member and a lower cross member, an upright beam, and a diagonal brace. A seat belt retractor is attached to the slide rail assembly by a bracket so that the axis of the retractor extends generally perpendicular to the axis of the slide assembly, and the belt webbing extends upwardly from the retractor to the top of the upright beam where it extends through the upholstery.

Unfortunately, this structure is relatively complicated and is relatively expensive to manufacture and assemble. In addition, although the seat belt moves with the seat, it cannot be adjusted to accommodate the differing heights of the users.

U.S. Pat. No. 5,310,247 to Fujimori, et al., discloses a vehicle seat and seat belt arrangement wherein the retractor is mounted at the top of the vehicle seat back, with the axis of the retractor extending from side to side. As a standard retractor will lock if the seat belt is moved more than about approximately 4 degrees from a standard position, a standard seat belt retractor will not work in connection with this design. Although efforts are being made to develop an improved retractor, it would be desirable to use a standard low-cost retractor.

Fujimori also discloses the use of a separate brace arm attached to the seat back at the top and spaced from the seat back of the bottom to provide additional support for the seat back during impact. This requires a special mechanism to allow both the seat back and the bracing arm to recline during use and adds to the cost of the assembly. Again, the assembly would not appear to provide for adjustability to accommodate differences in heights of the wearers.

U.S. Pat. No. 5,390,982 to Johnson, et al., discloses an adjustable belt guide and head rest assembly in which the seat belt is mounted on the vehicle seat back while permitting adjustability of the shoulder belt through adjustment of the vehicle head rest. The seat belt retractor is mounted within the frame of the seat bottom, with the retractor axis extending from side to side substantially perpendicular to the axis of the slider. The seat belt webbing extends upward through a roller mounted within the head rest at the top of a relatively heavy structural beam. To facilitate the movement of the shoulder belt guide assembly including the roller relative the beam section, a motorized adjustment system is provided.

As will be appreciated, this system is relatively complicated and expensive and has a relatively nonstandard appearance.

Thus, there is needed a simple, reliable, low-cost seat belt assembly and retractor system which can be conveniently operated regardless of the position of the seat with respect to the slider.

Applicant's invention is an improved vehicle seat and seat belt assembly in which the seat belt assembly is mounted directly to the vehicle seat to avoid changes in the position of the seat belt during adjustment of the seat. The vehicle seat and seat back assembly is particularly adapted to be manufactured using relatively simple and standard materials, at low cost while providing high strength and impact resistance and without significantly altering the external appearance of the vehicle seats.

One aspect of the invention is a vehicle seat and seat belt assembly including a first track, a second track, a platform slidable relative to the first track and second track, a belt guide, a seat belt retractor, a seat belt, a first latch member and a second latch member. The platform includes a seat bottom, a first bracket, a second bracket, a seat back, a first layer of upholstery and a second layer of upholstery. The seat bottom defines an upper surface, a first side, a second side, a front and a back. The first bracket is fixed relative to the seat bottom and is mounted on and slidable with respect to the first track. The second is bracket is fixed relative to the seat bottom and is likewise mounted on and slidable with respect to the second track. The seat back has a top end, a bottom end, a first side, a second side, a front face and a back face. The seat back is mounted on the seat bottom. The first layer of upholstery covers at least the first side, the second side and the front face of the seat back and defines a first interior envelope. The second layer of upholstery covers at least the first side, the second side and the upper surface of the seat bottom and defines a second interior envelope. The belt guide is mounted to the seat back external to the first interior envelope and the seat back retractor is mounted on the platform beneath the belt guide. The seat belt has a first end connected to the retractor and a second end secured to the platform proximate the first track. The seat belt extends upward from the retractor along the first side of the seat back and through the belt guide. The first latch member is slidably secured to the seat belt between the belt guide and the second end. The second latch member is secured to the platform proximate the second track. One of the first latch member and the second latch member is sized and shaped to receive and retain the other of the first latch member and the second latch member.

Advantageously, substantially all of the seat belt is mounted external the first and second interior envelopes. Desirably all of the seat belt is mounted external the first and second interior envelopes. Importantly, this facilitates the relatively easy and inexpensive upholstering and assembly of the seat assembly. Likewise, the web of the seat belt desirably extends flat along the first side of the seat back between the retractor and the belt guide. Advantageously, the retractor is mounted proximate the seat bottom and defines an axis of rotation which extends generally parallel to the first track. Desirably, the seat belt extends from the retractor through the belt guide toward the seat back. Again, this positioning facilitates the proper operation of the seat belt, both during normal use and in impact situations.

Another important aspect of the invention is the provision of a first member fixed to the seat back and a second member, the first member and second member sized and shaped to be movably retained by one another, wherein the belt guide is mounted on the second member. Desirably, the first member is fixed to the first side of the seat back proximate the top end. The first member and second member form a series of stations extending between the top end and the bottom end of the seat back and the assembly further includes a lock selectively preventing movement of the first member relative to the second member. Advantageously, the second member defines a horizontal axis about which the belt guide is rotatable. Importantly, this structural arrangement facilitates the adjustment of the seat belt relative the seat, to accommodate the individual passenger's size.

Advantageously, the seat back further comprises an external frame having an upper horizontal arm, a lower horizontal arm, a first vertical arm and a second vertical arm. The assembly desirably includes an internal reinforcing member. The internal reinforcing member is advantageously secured to the first vertical arm proximate the upper horizontal arm, the lower horizontal arm and the second vertical proximate the upper horizontal arm. Advantageously, the internal reinforcing member is substantially U-shaped. To minimize costs and increase strength, the internal reinforcing member desirably comprises a one piece integrally formed tube of substantially uniform cross-section.

Another important aspect of the invention is a vehicle seat and seat belt assembly including a first track, a second track, a platform slidable relative to the first track and the second track, a seat belt, a first latch member and a second latch member. The platform includes a seat bottom, a first bracket, a second bracket, a seat back, a first layer of upholstery, a belt guide, a first member and a second member. The first and second brackets are fixed relative to the seat bottom and are slidable with respect to the first track and second track, respectively. The seat back has a top end, a bottom end, a first side, a second side, a front face and a back face. The seat back is mounted on the seat bottom. The first layer of upholstery covers at least the first side, the second side and the front face of the seat back and defines a first interior envelope. The second layer of upholstery covers at least the first side, the second side and the upper face of the seat bottom and defines a second interior envelope. The first member is fixed to the seat back and the first and second member are sized and shaped to be movably retained by one another, with the belt guide being mounted on the second member. The seat belt retractor is mounted on the platform. The seat belt has a first end connected to the retractor and a second end secured to the platform so that the seat belt extends through the belt guide. A first latch member is slidably secured to the seat belt and the second latch member is secured to the platform with one of the first latch member and the second latch member being sized and shaped to receive and retain the other of the first latch member and the second latch member.

Another aspect of the invention is a vehicle seat and seat belt assembly including a first track, a second track, a slidable platform, a seat belt retractor, a seat belt, a first latch member and a second latch member. The platform is slidable relative to the first track and the second track. The platform includes a seat bottom, a first bracket, a second bracket, a seat back, a first layer of upholstery, a second layer of upholstery and a belt guide. The first and second brackets are fixed to the seat bottom and are slidable relative to the first track and the second track respectively. The seat back has a top end, a bottom end, a first side, a second side, a front face and a back face and the seat back is mounted on the seat bottom. The seat back includes an external frame, and an internal reinforcing member. The external frame includes an upper horizontal arm, a lower horizontal arm, a first vertical arm and a second vertical arm. The internal reinforcing member is secured to the first vertical arm proximate the upper horizontal arm, is secured to the lower horizontal arm and is secured to the second vertical arm proximate the upper horizontal arm. The first layer of upholstery covers at least the first side, the second side and the front face of the seat back and defines a first interior envelope. The second layer of upholstery covers at least the first side, the second side and the upper surface of the seat bottom and defines a second interior envelope. The belt guide is mounted to the seat back and the seat belt retractor is mounted on the platform. The seat belt has a first end connected to the retractor and a second end secured to the platform, with the seat belt extending through the belt guide. The first latch member is slidably secured to the seat belt and the second latch member is secured to the platform, with one of the first latch member and the second latch member being sized and shaped to receive and retain the other of the first latch member and the second latch member.

Advantageously, the reinforcing member is secured along a substantial portion of the length of the first vertical arm, the lower horizontal arm and the second vertical arm. Desirably, the internal reinforcing member is substantially U-shaped and comprises a one piece integrally formed tube. Advantageously, to minimize cost, the reinforcing member defines a substantially uniform cross-section.

BRIEF DESCRIPTION OF THE DRAWINGS

FIG. 3a is an enlarged view of the portion of FIG. 3 within the circle 3a—3a.

DETAIL DESCRIPTION OF THE PREFERRED EMBODIMENT

Referring to FIGS. 1–5, a preferred embodiment of the vehicle seat and seat belt assembly 10 of the invention will now be described.

The assembly includes a fixed track unit 12, including a first track 14 and a second track 16, upon which a sliding platform 18 is slidable. The sliding platform includes a sitting pedestal or seat bottom 20 to which is secured a first bracket 22 slidably received by the first track 14 and a second bracket 24 slidably mateable with the second track 16. A seat back 26 is secured to the seat bottom 20 by a pair of hinges or recliner mechanisms 28.

A seat belt retractor 30 is mounted on one of the pair of hinges 28 and a belt guide 32 is secured to the seat back above the retractor 30. A seat belt 34 is mounted on the sliding platform 18 so that the seat belt is fixed relative the sliding platform 18 and an individual seated on the sliding platform 18, while being slidable relative the fixed track unit 12. Specifically, the seat belt 34 has a first end 36 secured to the retractor 30 and a second end 38 secured to the hinge 28 upon which the retractor 30 is mounted. A first latch member or clasp 40 is slidably secured to the seat belt 34 between the belt guide 32 and the second end 38. A second latch member or buckle 42 is secured to the platform on the opposite side of the seat bottom 20.

The seat back 26 will now be described in detail. The seat back includes an upwardly extending top end 44, a bottom end 46 proximate the seat bottom 20, a first side 48 to which the retractor 30 is secured, a second side 50, a front face 52 against which the passenger rests his or her torso, and a back face 55.

Figure 1:
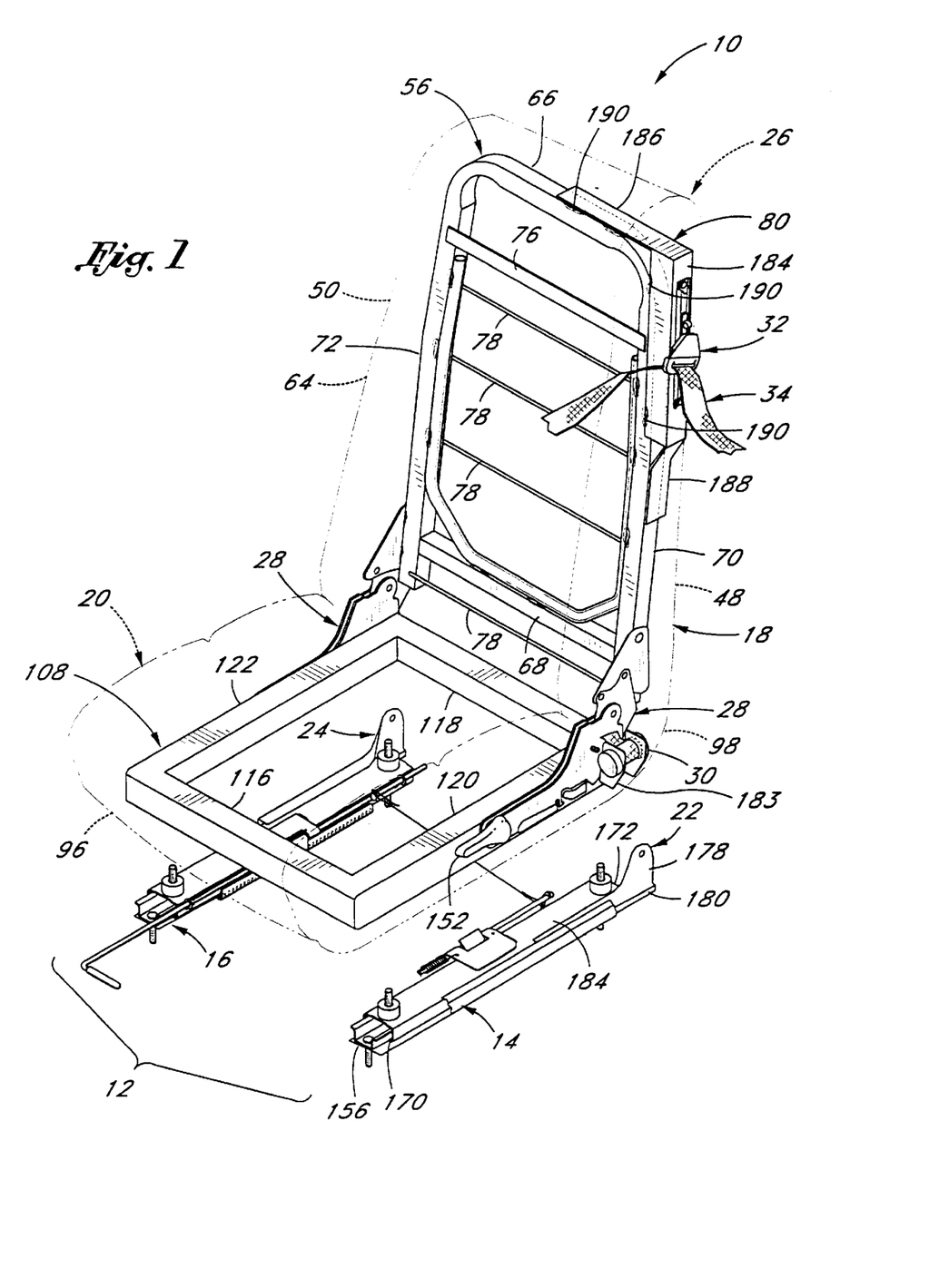
FIG. 1 is a partially exploded perspective view of the vehicle seat and seat belt assembly, with the upholstery and padding shown in phantom.

Referring to FIG. 1, the seat back 26 includes a back frame 56 and a reinforcing member 58. The back frame 56 and reinforcing member 58 are covered by foam padding 60 (see FIG. 10). The padding 60, in turn, is covered by a first layer of upholstery 62 which defines a first interior envelope.

Referring to FIGS. 1, 3, 5, 6 and 7, the back frame 56 includes an upper horizontal arm 66 and a lower horizontal arm 68, which connect a first vertical column 70 and a second vertical column 72. The first column 70 is positioned along the first side of the seat back, and the second column 72 is positioned along the second side of the seat back. Advantageously, the first column 70, the upper horizontal arm 66 and the second column 72 are defined by an integrally formed U-shaped unit 74, having a substantially uniform rectangular cross-section. The open end of the U-shaped unit 74 is thus closed by the lower horizontal arm 68. A strengthening flange 76 is mounted near the top end 44 of the seat back and extends generally horizontally between the first column 70 and second column 72. Additionally, a plurality of horizontally aligned strengthening rods 78 extend between the first column 70 and the second column 72 between the strengthening flange 76 and the lower end of the columns 70, 72. A mounting bracket 80 is secured to the junction of the upper horizontal arm 66 and first column 70, as described in detail below.

The reinforcing member 58 is generally U-shaped and includes a first vertical portion 82 extending along the first vertical column 70 of the back frame, a first angled portion 84 extending downward at an angle away from the first column 70, a horizontal portion 86 extending along the lower horizontal arm 68, a second angled portion 88 extending upward away from the lower horizontal arm 68 (at approximately a 45 degree angle) and toward the second column 72 (at approximately a 45 degree angle), and a second vertical portion 90 extending along the second vertical column 72. The reinforcing member 58 is secured to the back frame at various weld locations 92 along each of the first columns 70, lower horizontal arm 68 and second column 72. Desirably, the reinforcing member is an integrally formed one-piece tube having a generally uniform cross-section, although some variation in the cross-section of the tube occurs at the intersections between the various portions due to bending.

The seat bottom 20 will now be discussed with reference to FIGS. 1–5. The seat bottom 20 includes a front end 96, a back end 98, a first side 100 corresponding to the location of the retractor, a second side 102, upper face 104 upon which the rider sits, and a lower face 106. The bottom 20 includes a bottom frame 108 which is covered by a bottom padding 110, such as foam. The bottom frame 108 and bottom padding 110 are covered by a second layer of upholstery 112 which defines a second interior envelope.

The bottom frame 108 includes a front cross-member 116, a rear cross-member 118 which extends between a first side member 120 and a second side member 122 so as to form a generally rectangular shape. Each of the members 116, 118, 120 and 122 of the bottom frame 108 are generally elongated and have a rectangular cross-section.

As discussed above, the seat back 26 is secured to the seat bottom 20 by means of a pair of hinges or recliner mechanisms 28. As both recliner mechanisms are identical, only the first hinge mechanism will be described herein for purposes of illustration. The first hinge mechanism 28 includes an upper hinge portion 124 and a lower hinge portion 126 connected by a pivot pin 128. The upper hinge portion 124 includes a mounting bracket 130 secured to the lower end of the first vertical column 70 of the back frame 56 by an appropriate fastener. The mounting bracket 130 is connected to a pivot plate 132 defining a series of gear teeth 134, each of which defines an included angle 136. The lower hinge portion 126 defines a pair of sandwich plates 138 which straddle a locking plate 140 which defines a second series of gear teeth 142 defining a second included angle 144 which mate with the series of gear teeth of the upper hinge portion 124.

As discussed in greater detail in Applicant's issued U.S. Pat. No. 5,433,507, entitled "Seatback Recliner Mechanism," issued Jul. 18, 1995, which is hereby incorporated by reference, the locking plate is selectively engageable with the pivot plate of the upper hinge portion 132 by means of a cam 146 operated by means of a link mechanism 148 connected to a release pivot (not shown) operated by a handle 152 at the front end of the lower hinge portion 126.

Although the disclosed embodiment incorporates two handles 134 for operating the respective hinge mechanisms 128, it is contemplated that these recliner mechanisms will be operated by a single handle and that the recliner mechanisms 28 will be connected by a standard connecting mechanism known to those of skill in the art for this purpose.

Figure 6:
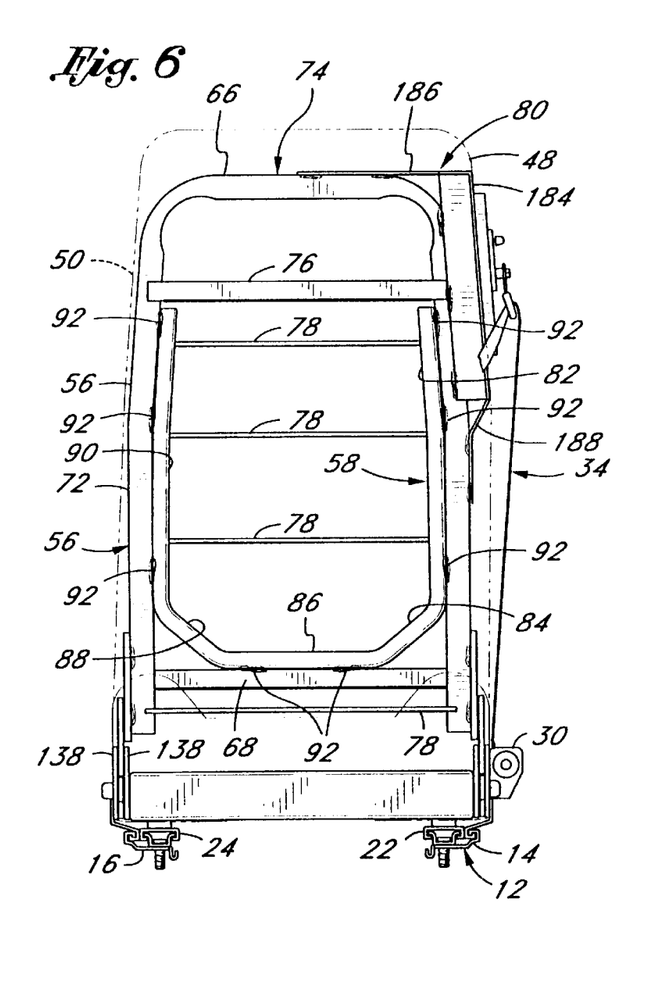
FIG. 6 is a front view of the assembly of FIG. 1, with the upholster and padding shown in phantom.
Figure 7:
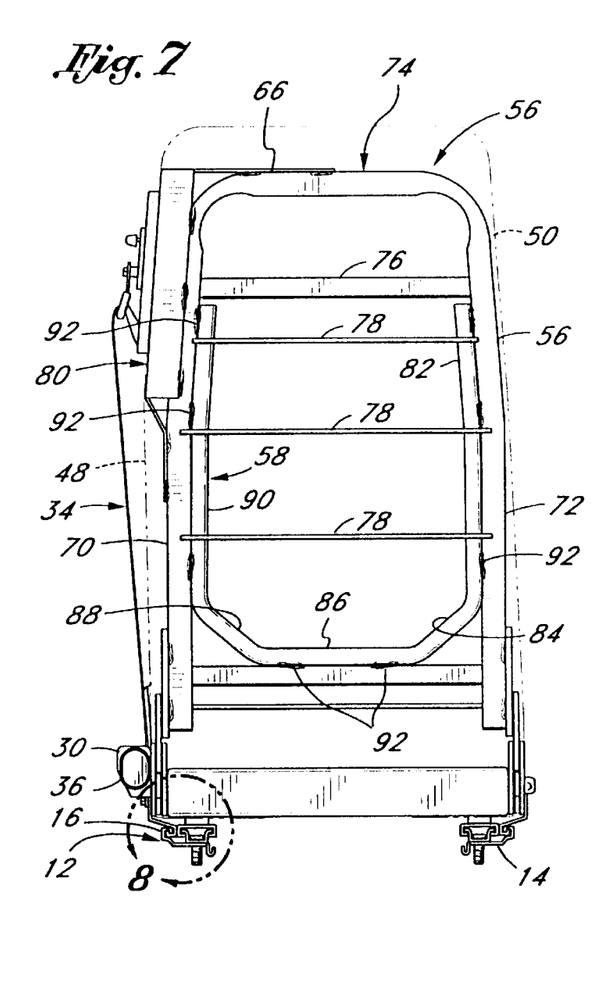
FIG. 7 is a rear view of the assembly of FIG. 1, with the upholstery and padding shown in phantom.
Figure 8:
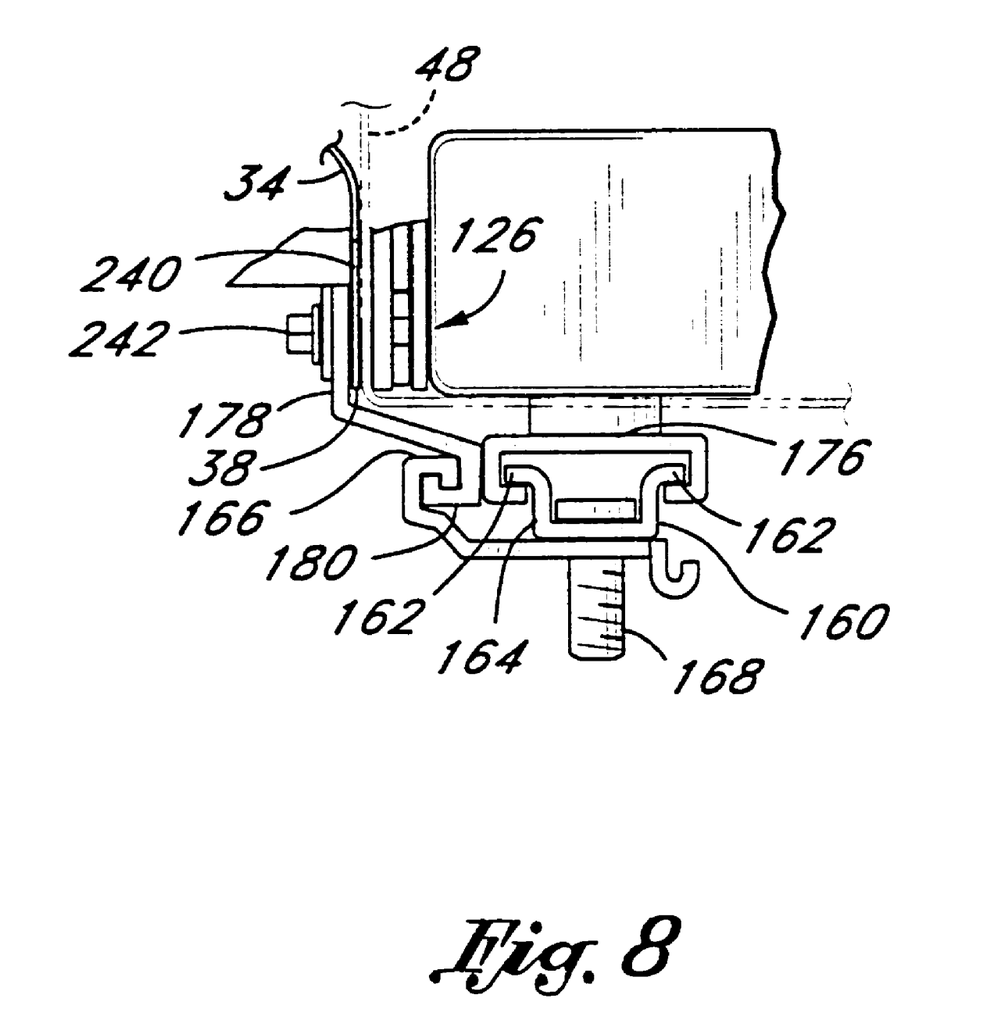
FIG. 8 is an enlarged view of the portion of FIG. 7 within 8—8.

As the first track 14 and second track 16 are mirror images of one another, only the first track will be described for purposes of illustration. Referring now to FIGS. 1–8, the first track 14 includes a front 156 and a rear 158. As viewed from either end, as shown in FIGS. 6–8, the track includes a main track portion 160 having a generally omega-shaped cross-section, which defines a pair of outer lips 162 and a locking plate portion 164. The outer side of the locking plate portion 164 defines an L-shaped finger 166. Both the main track portion 160 and the locking plate portion 164 are secured to the pan of the vehicle by mounting bolts 168.

As with the first track 14 and second track 16, the first bracket 22 and second bracket 24 are mirror images of one another. Accordingly, only the first bracket 22 will be described for illustration purposes.

The first bracket includes a front 170 and a rear 172. The rear 172 defines an enlarged foot portion 174, the purpose of which will be described below. The mounting bracket 22 defines a C-shaped main bracket section 176 and a locking plate section 178. The main bracket section 176 mates with the main track portion 160. The locking plate section includes an L-shaped flange 180 which mates with the L-shaped finger 166 of the locking plate portion 164 of the first track 14. A mounting bolt 168 secures the locking plate section 178 to the foot portion 174.

The seat belt retractor 30 is likewise secured to the enlarged foot portion 174 at the rear 172 of the first bracket 22. The seat belt retractor 30 includes a generally C-shaped (as seen from the top down) housing 183, which straddles a spool 185. The spool rotates about an axle (not shown), which defines an axis of rotation A. It would also be possible to mount the retractor 30 on the upper hinge portion 124 to further limit changes in angle between the seat belt and the seat belt retractor axis A.

As discussed above, the back frame 56 includes a mounting bracket 80. As illustrated in FIGS. 1, 3, 6 and 7, the mounting bracket 80 includes a generally rectangular box-shaped body 184, a first generally rectangular strut 186 secured to the upper horizontal arm 66 of the back frame 56, and a second strut 188 secured to the first vertical column 70 of the back frame 56. The body 184 and struts 186 and 188 are secured to the mating portions of the back frame 56 by a series of welds 190.

Figure 2:
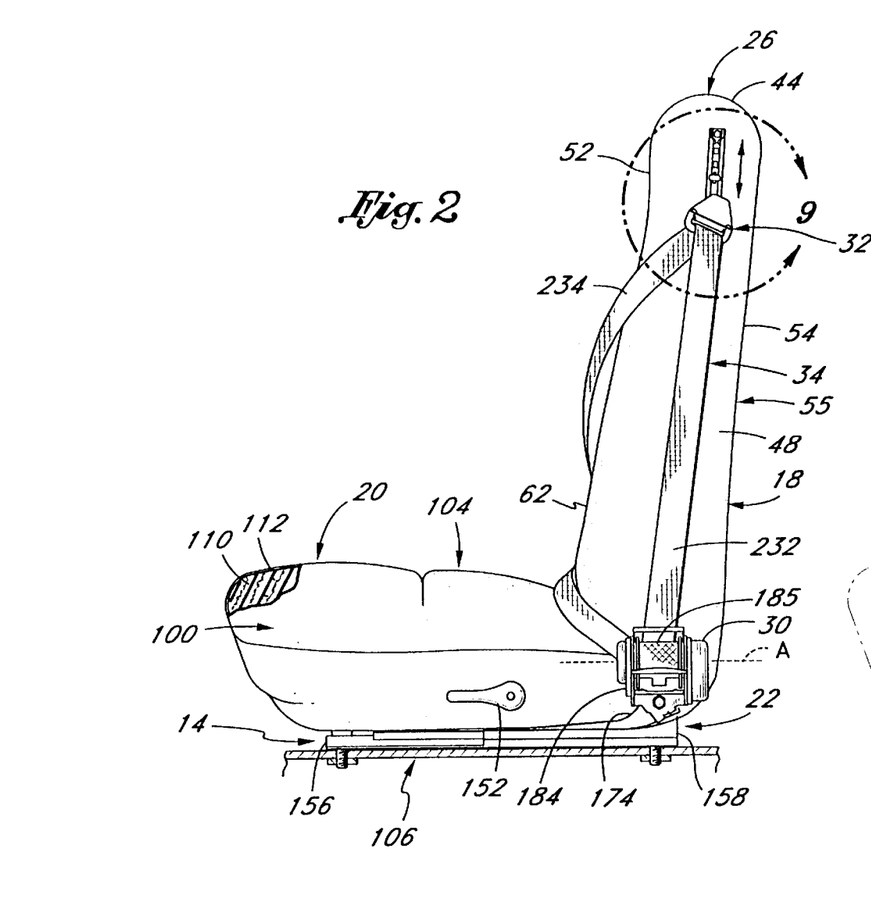
FIG. 2 is a left side view of the assembly of FIG. 1.
Figure 3:
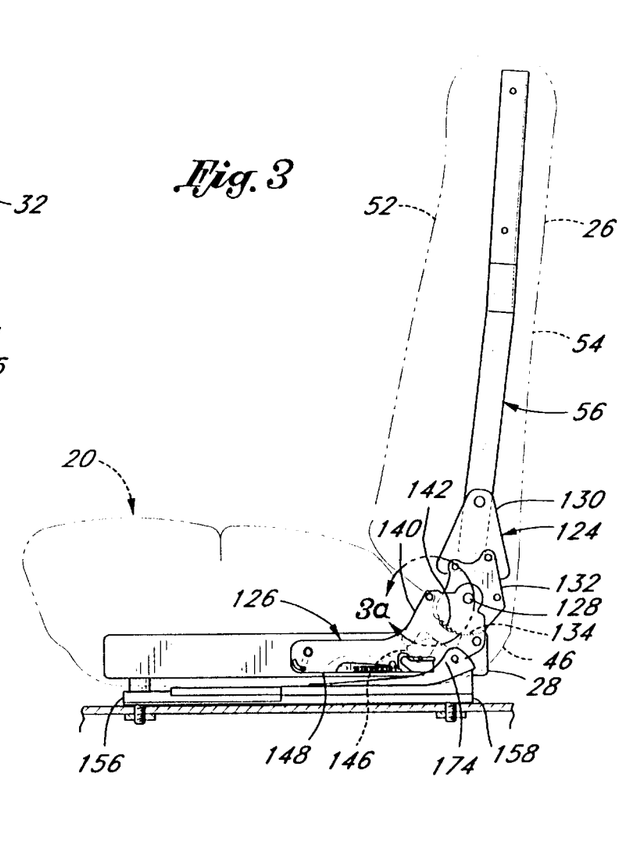
FIG. 3 is a left side view of the assembly of FIG. 1 with the upholstery and padding shown in phantom.
Figure 3A:
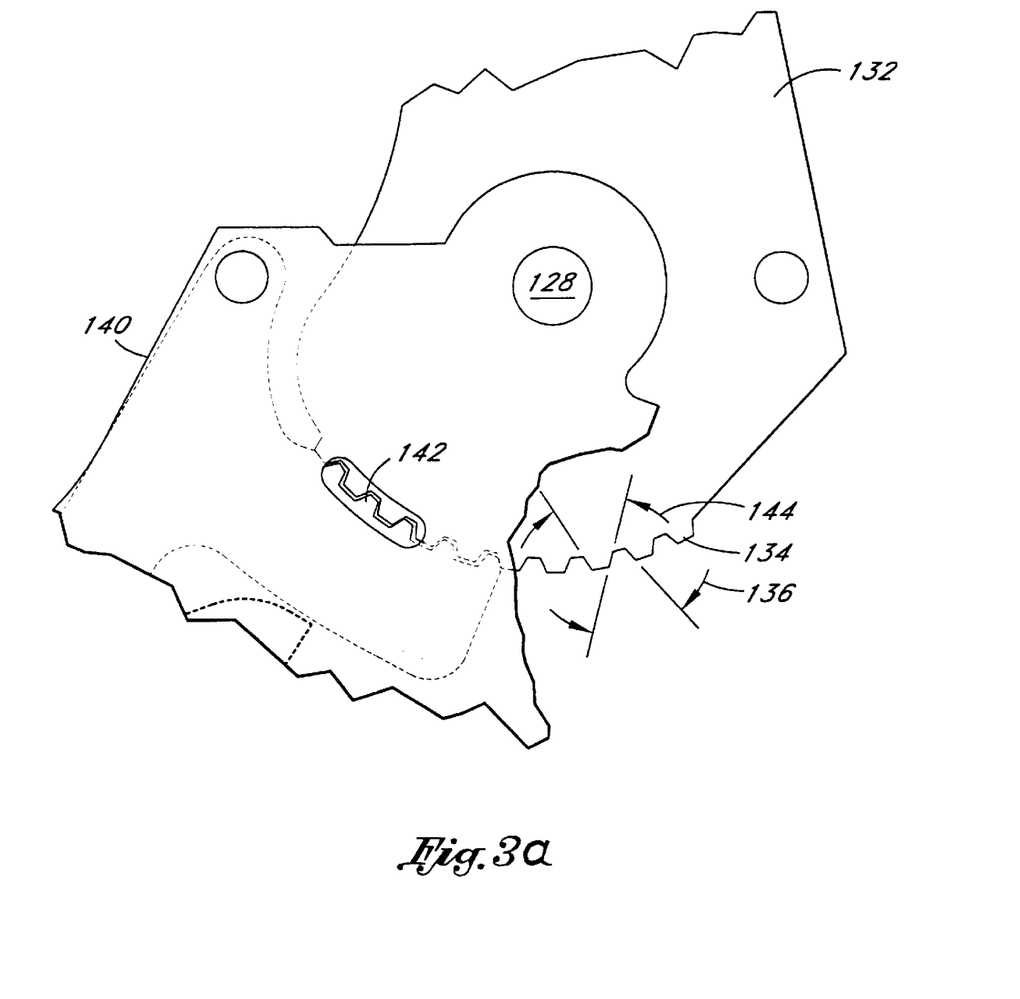
Figure 4:
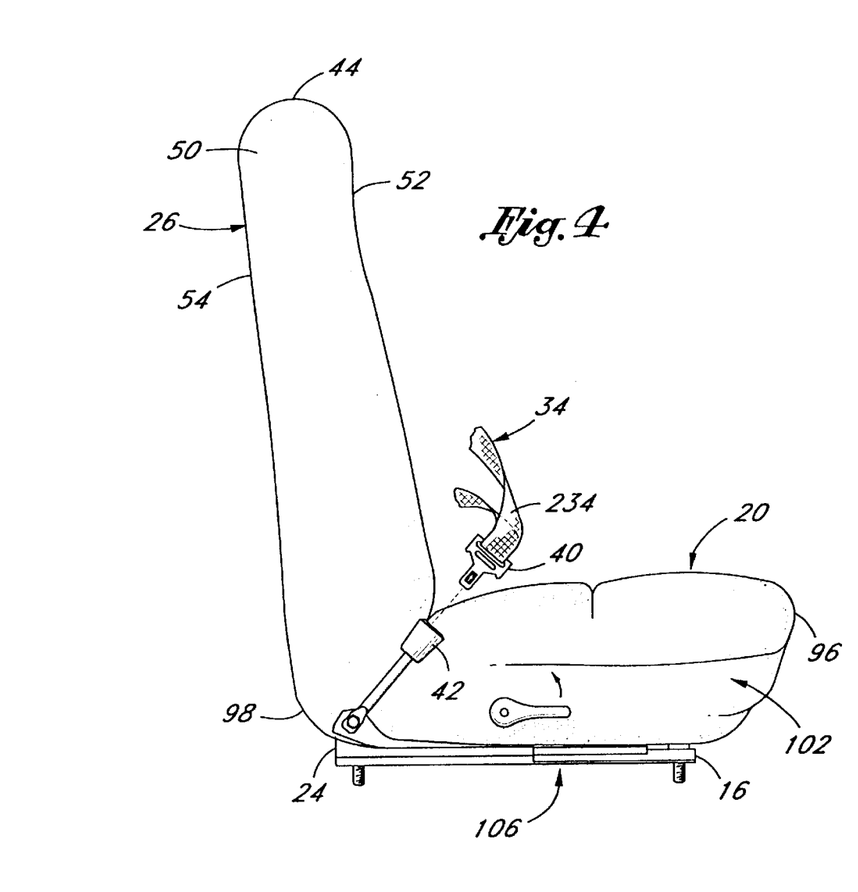
FIG. 4 is a right side view of the assembly of FIG. 1.
Figure 5:
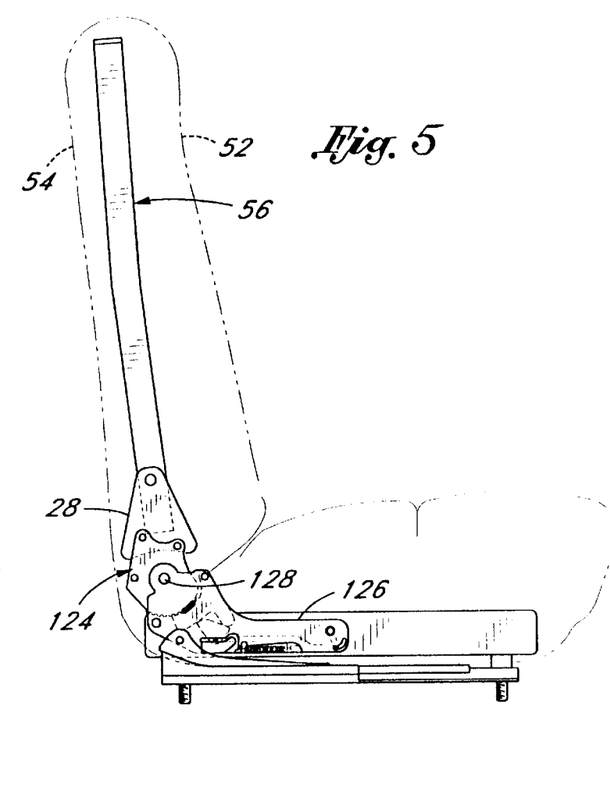
FIG. 5 is a right side view of the assembly of FIG. 1, with the upholstery and padding of the seat shown in phantom.
Figure 9:
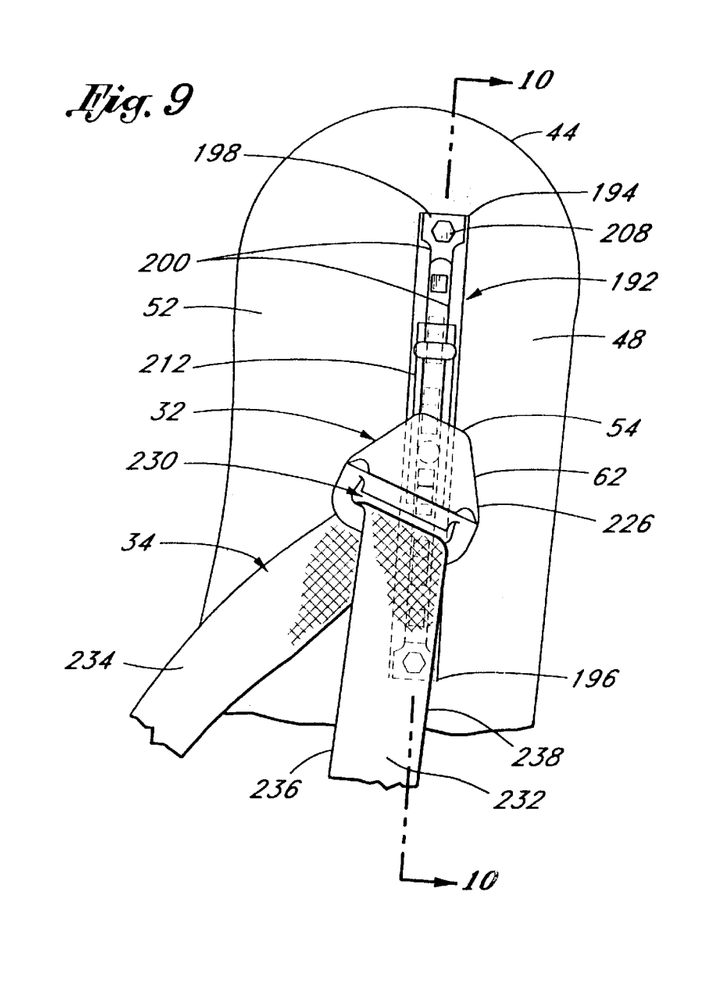
FIG. 9 is an enlarged left side view of the belt guide of the assembly of FIG. 1.
Figure 10:
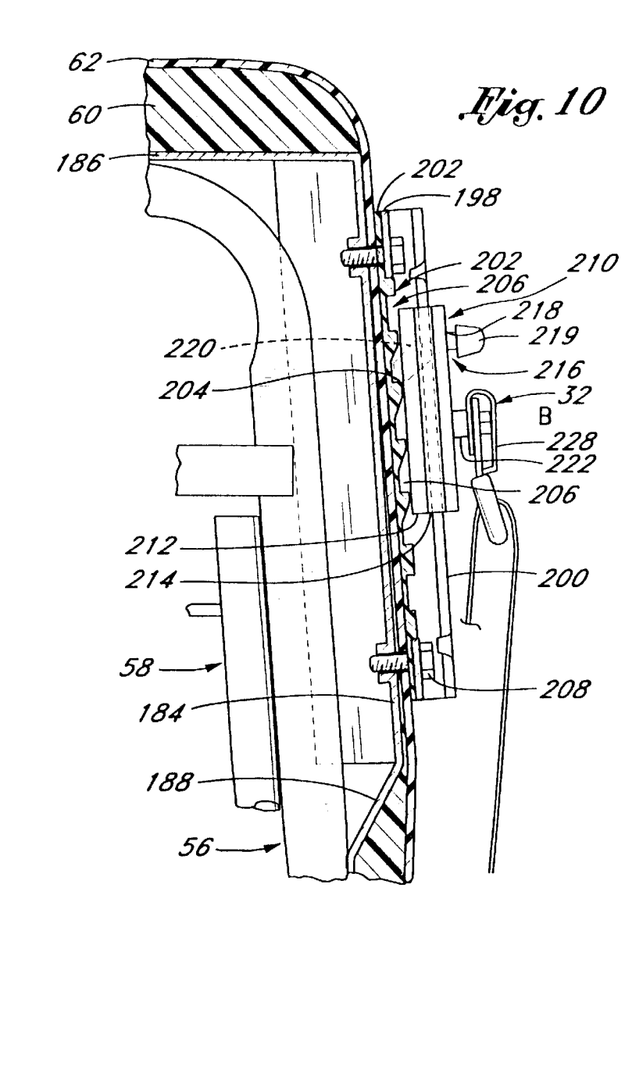
FIG. 10 is a cross-sectional view along 10—10 of FIG. 9.

Referring now to FIGS. 2, 9 and 10, the mounting of the belt guide 32 to the mounting bracket 80 will now be described. A first elongate member 192 or track having an upper end 194 and a lower end 196 is secured to the first side 48 of the seat back 26 proximate the top end 44 of the seat back 26 over the first layer of upholstery 62. The first member 192 includes a back plate 198 and a pair of L-shaped outer arms 200 which overhang the back plate 198. A profile plate 202 is secured to the back plate 198 between the back plate 198 and the first layer of upholstery 62. The profile plate 202 defines a series of raised steps 204, which in turn define a series of stations 206 between each pair of steps. The back plate 198 and profile plate 202 are secured to the body 184 of the mounting bracket 80 by mounting bolts 208.

The first member 192 slidably receives a second member or carriage 210 to which the belt guide 32 is secured. Specifically, the carriage 210 a generally rectangular body 212 which defines a pair of opposing grooves 214 along the front and rear faces of the carriage 210. The carriage 210 further includes an actuator 216 secured to the carriage body 212. The actuator 216 includes a control arm 218 and a locking arm 220. A control knob 219 is secured to the distal end of the control arm 218. One end of the locking arm 220 is joined to the control arm at a roughly 120 degree angle and the other and cooperates with the raised steps 204 of the first member 192 to secure the carriage 210 against movement relative the first member 192, and therefore relative the seat back 26. The locking arm 220 is biased into engagement with the profile plate 202 by a suitable spring (not shown). The belt guide 32 is secured to the carriage 210 by means of a mounting pin 222 defining a pin axis about which the belt guide 32 is rotatable.

The belt guide 32 defines a generally triangular body 226 comprising a heavy steel ring. The upper portion of the body 226 is covered by a generally triangular pin guard 228 which protects the passenger from scraping against the end of the mounting pin 222. The belt guide 32 defines a thin slot 230 which slidably receives the seat belt 34.

Referring now to FIG. 2 and FIG. 9, the seat belt 34 includes a first web face 232 which faces outward away from the first side 48 of the seat back 26 between the retractor 30 and the belt guide 32, and faces inward between the belt guide 32 and the second latch member 42, and faces outward between the second latch member 42 and the second end of the seat belt 38. The seat belt 34 also includes a second web face 234 which faces inward toward the first side 48 of the seat back 26 between the retractor guide 30 and the belt guide 32, and faces outward between the belt guide 32 and the second latch member 42, and faces inward between the second latch member 42 and the second end of the seat belt 38. The seat belt further comprises a first edge 236 toward the front of the seat back 26 between the retractor 30 and the belt guide 32, and a second edge 238, toward the rear of the seat back 26 (between the belt guide 32 and the retractor 30). The first end 36 of the seat belt 34 is secured to the spool 185 of the retractor in a conventional manner, such as by means of a standard first end fastener [not shown], as well-known in the art. The second end 38 of the seat belt is provided with a standard metal tab 240 which is sandwiched between the locking plate section 178 of the mounting bracket and the second layer 48 of upholstery. The locking plate section 178 is held in place by a mounting bolt 182 which extends into the lower portion 126 of the hinge which provides the structural support.

The first latch member 40 is desirably a conventional male seat belt latch member or clasp which is receivably and lockably retained in a similarly conventional second female latch member or buckle 42.

Operation

The operation of the vehicle seat and seat belt assembly 10 will now be described. In operation, the buttocks of the passenger are supported by the upper face 104 of the seat bottom 20 and the torso of the passenger is rested against the front face 52 of the seat back 26. The passenger then grasps the first latch member 40, pulling it across the body from the first side 48 of the seat back toward the second side of the seat back 50. This causes a seat belt 34 to overcome the bias of the seat belt retractor 30 so that the seat belt is pulled from a coiled position around the axis of the spool 186 flat along the first side 48 of the seat back 26 through the slot 230 of the belt guide 32 until a sufficient length of seat belt 34 has been uncoiled from the retractor 30 that the seat belt first latch member 246 is able to engage the second latch member 42 near the bottom end 46 of the second side 50 of the seat back.

Because the seat belt is mounted on the sliding platform 18, the movement of the sliding platform 18 relative the fixed track unit 12 will not affect the position of the seat belt relative the passenger.

Importantly, the configuration of the vehicle seat and seat belt assembly 10 permits a standard retractor 30 to be used, ensuring the feasibility of the use of the vehicle seat and seat belt assembly, and minimizing the cost of the assembly 10. That is, the structural configuration of the assembly prevents movement of the seat belt relative the seat during adjustment of the position of the seat relative the vehicle. Importantly, this structural configuration lends itself to use of a standard seat belt retractor, in that the angle in which the seat belt is positioned relative the retractor is generally parallel to the axis of the seat back retractor in standard sitting positions.

Additionally, the structural configuration of the assembly ensures that the seat belt is always positioned in a comfortable position relative the passenger, and snugly holds the passenger in the seat.

Importantly, the seat belt and seat belt assembly permits the position of the belt guide 32 to be quickly and easily adjusted by the passenger or, in the case of a young child, by the parent to ensure that the position of the seat belt relative the passenger is such that it reduces the risk of injury. Advantageously, the vehicle seat and seat belt assembly is of relatively simple configuration, and is relatively easy and inexpensive to manufacture and assemble. Significantly, the configuration of the seat and seat belt assembly does not significantly increase the difficulty or cost of upholstering the vehicle seat.

Further, the vehicle seat and seat belt assembly 10 is particular adapted to be able to withstand impact forces. In particular, the configuration of the reinforcing member 58 results in the impact force being transmitted downward from the belt guide 32 towards the bottom end 46 of the first column 70 to the lower horizontal arm 68 of the back frame. In addition, the force is likewise transmitted from the lower horizontal arm 68 upward along the second column 72 of the back frame. The U-shaped member 58 transmits a significant amount of the force downward proximate the lower horizontal arm 68, thereby reducing the moment forces acting on the hinge mechanism 28. In addition, the reinforcing member 58 also transmits force from the belt guide 32 not only to the first column 70, but also to the second column 72, thereby reducing the amount of force exerted on any single element of the back frame 56.

Significantly, the mounting bracket 80 strengthens the back frame proximate the belt guide 32 and avoids the need to drill mounting holes in the first column 70 which otherwise would result in the weakening of the first column 70.

Advantageously, the relatively large included angle 36 defined by the gear teeth 134 of the upper hinge portion 124 and the relatively large second included angle 144 of the gear teeth 142 of the lower hinge portion 126 significantly enhance the ability of the vehicle assembly to resist impact forces exerted on the belt guide. Similarly, the provision of interlocking plate portions 164 and interlocking plate sections 178, in conjunction with track section 160 and bracket portion 176 on both sides of the assembly 10 resists any tendency of the sliding platform 18 to move relative the fixed track unit 12.

Advantageously, the vehicle seat and seat belt assembly is simple, and reliable. It utilizes both low-cost components and is relatively easy to manufacture.

While certain features and enhancements of the assembly have been described in detail herein, it should be understood that numerous alternative designs and modifications are possible within the scope and spirit of the invention, and that this invention includes all products within the scope or spirit thereof.

What is claimed is:

1. A vehicle seat and seat belt assembly, comprising:

a first track having a front and a rear;

a second track having a front and a rear;

a platform slidable relative to said first track and said second track, comprising:

a seat bottom defining an upper surface, a first side, a second side, a front and a back, said seat bottom further comprising a frame defining a lower surface;

a first bracket secured to said lower surface of said frame of said seat bottom and mounted on and slidable with respect to said first track;

a second bracket fixed relative to said seat bottom and mounted on and slidable with respect to said second track; and a seat back having a top end, a bottom end, a first side, a second side, a front face and a back face, said seat back mounted on said seat bottom;

a first layer of upholstery, said first layer covering at least said first side, said second side and said front face of said seat back and defining a first interior envelope;

a second layer of upholstery, said second layer covering at least said first side, said second side and said upper surface of said seat bottom and defining a second interior envelope, wherein said seat back further comprises:

a closed four-sided structural outer frame having an upper horizonal arm, a lower horizontal arm, a first vertical arm and a second vertical arm, an internal reinforcing member secured to said first vertical arm proximate said upper horizontal arm, secured to said lower horizontal arm and secured to said second vertical arm proximate said upper horizontal arm, wherein said internal reinforcing member is secured along a substantial portion of the length of said first vertical arm, said lower horizontal arm and said second vertical arm and wherein said internal reinforcing member is substantially U-shaped and comprises a single integrally formed piece.

2. The assembly of claim 1, wherein said internal reinforcing member comprises hollow tubing.

3. The assembly of claim 2, wherein said reinforcing member defines a substantially uniform cross-section.

4. A vehicle seat and seat belt assembly, comprising:

a first track and bracket pair and a second track and bracket pair cooperating to define a direction of relative movement, each said track and bracket pair comprising:

a track adapted to be secured to the floor pan of a vehicle, comprising a first track portion, a second track portion and a third track portion;

a bracket comprising a first bracket portion slidable with respect to said first track portion, a second bracket portion slidable with respect to said second track portion and a lock portion slidable with respect to said third track portion, said first track portion and said first bracket portion mechanically interfering with separation of said first track portion and said first bracket portion in a direction other than said direction of relative movement, said second track portion and said second bracket portion mechanically interfering with separation of said second track portion and said second bracket portion in a direction other than said direction of relative movement, said third track portion and said lock portion mechanically interfering with separation of said lock portion and said third bracket portion in a direction other than said direction of relative movement, each said bracket comprising a portion of a movable platform;

a seat bottom to which each said bracket is secured;

a seat back connected to said seat bottom;

a belt guide mounted to said seat back;

a seat belt retractor mounted to said platform proximate said first track and bracket pair;

a seat belt having a first end connected to said retractor and a second end secured to said platform, said seat belt extending upward from said retractor along a first side of said seat back and through said belt guide;

a first latch member slidably secured to said seat between said belt guide and said second end; and a second latch member secured to said platform proximate said second track and bracket pair, one of said first latch member and said second latch member being sized and shaped to retain the other of said first latch member and said second latch member.

5. The assembly of claim 4, wherein for each said track and bracket pair, said lock portion is secured to said track.

* * * * *